(12) United States Patent
Kekicheff et al.

(10) Patent No.: US 8,132,713 B2
(45) Date of Patent: Mar. 13, 2012

(54) SYSTEM AND METHOD FOR AUTOMATED SELECTION OF TESTING CRITERIA FOR PAYMENT DEVICES

(75) Inventors: Marc Kekicheff, Foster City, CA (US); Brahmaiah Thatiparthi, Cupertino, CA (US); John McNulty, Jr., Union City, CA (US); Edward Kurtek, Fremont, CA (US); Adam Vaughan, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 199 days.

(21) Appl. No.: 12/710,509

(22) Filed: Feb. 23, 2010

(65) Prior Publication Data

US 2011/0089232 A1 Apr. 21, 2011

Related U.S. Application Data

(60) Provisional application No. 61/252,584, filed on Oct. 16, 2009.

(51) Int. Cl.
*G06F 17/00* (2006.01)
*G06Q 40/00* (2006.01)
(52) U.S. Cl. ........................ 235/375; 235/379
(58) Field of Classification Search ........... 235/375–380
See application file for complete search history.

(56) References Cited

U.S. PATENT DOCUMENTS

| | | | |
|---|---|---|---|
| 6,785,845 B2 | 8/2004 | Venkataraman | |
| 7,184,916 B2* | 2/2007 | Resnick et al. | 702/118 |
| 7,239,973 B2* | 7/2007 | Schahl et al. | 702/122 |
| 7,478,365 B2 | 1/2009 | West et al. | |
| 2002/0022943 A1* | 2/2002 | Lapie | 702/183 |
| 2005/0033543 A1* | 2/2005 | Kubitz | 702/120 |
| 2005/0127173 A1 | 6/2005 | Idol, Jr. | |
| 2006/0041402 A1* | 2/2006 | Baker | 702/189 |
| 2007/0094541 A1 | 4/2007 | Kang | |

OTHER PUBLICATIONS

Beitz, A. M., et al., "A Tool for Generating Test Cases", ASWEC 93, Australian Software Engineering Conference, Sydney, Sep. 1993, 15 pages.

Cain, A., et al., "An Automatic Test Data Generation System Based on the Integrated Classification-Tree Methodology", 2004, Computer Science, vol. 3026, Springer, Berlin, 15 pages.

Schmitt, Michael, "Automatic Test Generation Based on Formal Specifications, Practical Procedures for Efficient State Space Exploration and Improved Representation of Test Cases", 2003, Dissertation, Georg-August-Universität Gottingën, 241 pages.

Rayadurgam, S., et al., "Generating MC/DC Adequate Test Sequences Through Model Checking", University of Minnesota, Computer Science and Engineering, Dec. 2003, 5 pages.

* cited by examiner

*Primary Examiner* — Jamara Franklin
(74) *Attorney, Agent, or Firm* — Kilpatrick Townsend & Stockton LLP (57) ABSTRACT

System and methods for generating one more tests to be performed on a payment device are provided. A vendor selects one or more features to be included in his payment device and provides that information to the system. The system analyzes the information and provides a list of tests to be performed on the reference payment device. In addition, the system also provides a list of one or more reference payment device configurations provided for testing purposes.

19 Claims, 9 Drawing Sheets

Payment Device Description

|  | Yes | No |
|---|---|---|
| Feature # 1 | ⊛ | ⊛ |
| Feature # 2 |  | ⊛ |
| Feature # 3 | ⊛ | ⊛ |
| Feature # 4 | ⊛ | ⊛ |
| ⋮ |  |  |
| Feature # N |  | ⊛ |

[ Calculate Test Configurations ] — 602

Please provide the following configurations with your reference Payment Device

| Configuration | Count | Configuration | Count |
|---|---|---|---|
| Configuration # 1 | 2 | Configuration # 10 | 0 |
| Configuration # 2 | 1 | Configuration # 11 | 2 |
| Configuration # 3 | 4 | Configuration # 13 | 3 |
| ⋮ |  | ⋮ |  |

[ Send to Configuration Generation System ] — 611

Batch Identifier: Batch 03-001          Configuration: VSDC03

| Test Case | Verdict | Notes |
|---|---|---|
| 1 | Pass/Fail/NA | |
| 2 | Pass/Fail/NA | |
| ⋮ | ⋮ | |
| N | Pass/Fail/NA | |

SYSTEM AND METHOD FOR AUTOMATED SELECTION OF TESTING CRITERIA FOR PAYMENT DEVICES

CROSS-REFERENCES TO RELATED APPLICATIONS

The present application claims benefit under 35 U.S.C. §119(e) of U.S. Provisional Patent Application No. 61/252,584, entitled "System and Method for Automated Selection of Testing Criteria for Payment Devices", filed Oct. 16, 2009, the contents of which are hereby incorporated by reference in their entirety for all purposes.

BACKGROUND

Payment transactions that involve cashless transactions have been popular for a long time. One of the advantages of cashless transaction is that it is considered more secure than carrying cash. There are several payment devices that are used by consumers in a cashless transaction. For example, a credit card is one of the most widely used payment device in the world. Similar to the credit card, there are numerous other consumer payment devices like a debit card, a pre-paid card, a smart card, a contactless card, and the like. All these payment devices are widely used to today to conduct cashless transactions.

In addition to the above-mentioned payment devices that allow tendering of payment, there are payment devices that accept and authorize the tendered payment. Such payment devices include point of sale (POS) devices, contactless card readers, or any other type of reader that is configured to accept and authorize payment.

There are several entities that provide these payment devices. For example, various banks and other financial institutions issue several different types of payment cards. There are various companies that provide the corresponding POS devices, card readers, etc. All these devices have to be compatible with each other and with the payment processing system in order for the payment authorization processing to work. There are several entities that provide payment processing systems, e.g., VISA, MASTERCARD, etc.

Each of the payment processing systems has certain operating specifications. Any vendor that intends to market a payment device to work on any of these payment processing systems has to make sure that his payment device complies with those operating specifications. Furthermore, the operating specifications for one payment processing system may not be the same as that for another payment processing system. Hence, often the payment devices have to be designed to work with the intended payment processing system.

Each payment device has to be certified by the entity managing the payment processing system, e.g., VISA or MASTERCARD, with which the payment device is designed to be operable. In order for the payment device to be certified by the entity managing the payment processing system, the vendor has to provide test results for his payment device that demonstrates the payment device's compatibility with the payment processing system. The entity that manages the payment processing system usually provides a specification detailing the various features that may be included in a payment device. The specification may also provide information about the tests that need to be performed based on the set of features that are to be implemented by the payment device.

Currently, any vendor that wishes to market a payment device designed to be operable with a particular payment processing system has to read and understand the specification for the payment processing system, build a reference payment device based on the specification and features to be included in the payment device, select or have a testing center select proper test criteria for that reference payment device by studying the specification, and test the reference payment device using the selected test criteria. Often, the specification is complex and open to misinterpretation resulting in either the wrong reference payment device being generated and/or wrong tests being run on the reference payment device. This can result in an unduly long delay in getting the reference payment device accurately tested and certified and may consequently result in loss of time and revenue for the vendor.

Therefore, it is desirable to have a system that reduces or eliminates the possibility of misinterpretation of the specification and test criteria and provide reliable information to the vendors and/or testing centers.

SUMMARY

The present disclosure is related to testing of a payment device. Specifically, embodiments of the present invention provide methods and system for automatically generating and executing a list of tests to be performed on a reference payment device based on selected features included in the reference payment device.

In one embodiment, a method for generating a test plan for a payment device is provided. The method includes receiving input indicative of one or more features included in a payment device, verifying that all mandatory features for the payment device have been supplied, using artificial intelligence to determine from a database, one or more tests to be performed on the reference payment device based at least in part on the one or more features of the reference payment device, and communicating information about the one or more tests to a testing device. In some embodiments, the method further includes receiving from the testing device, information about the test results and using artificial intelligence to analyze the test results against expected results according to the specification to deliver a final testing assessment of the reference payment device.

In some embodiments, the method further includes verifying compatibility of the payment device features with the specification of the payment processing system and verifying compatibility between the one or more features of the payment device. Verifying compatibility between the one or more features includes determining whether there are features that are mutually exclusive and determining whether there are features that are dependent on each other according to the payment processing system's specification.

In some embodiments, a computer readable media is provided. The computer readable media includes instructions which when executed by a processor embedded in a computer system cause the computer system to perform a method for determining a test to be performed on a reference payment device. The method includes receiving information related to a plurality of features associated with a payment device, verifying that the plurality of features include the mandatory features associated with the payment device, verifying that the plurality of features are compatible with each other, using artificial intelligence to determine one or more configurations of the reference payment device based at least in part on the information related to the plurality of features, and determining from a database of all potential tests, one or more tests to be performed on the reference payment device based at least in part on the information related to the plurality of features of the reference payment device. The method further includes communicating the one or more configurations of the reference payment device to a configuration generation system and communicating information about the one or more tests to be performed to a testing device.

In some embodiments, the method further includes verifying compatibility of the payment device features with the specification of the payment processing system and verifying compatibility between the one or more features of the payment device. Verifying compatibility between the one or more features includes determining whether there are features that are mutually exclusive and determining whether there are features that are dependent on each other according to the payment processing system's specification. In some embodiments, the method further includes determining, using artificial intelligence, one or more configurations of the reference payment device to be provided for testing the reference payment device wherein the one or more configurations are selected based at least in part on the one or more features of the payment device, and communicating the information about the one or more configurations to a configuration generation system.

Certain embodiments of the present invention provide a system that includes a user interface operable to receive input related to the plurality of features for a reference payment device. The system includes a communication device configured to present a user interface to a user wherein the user interface is configured to receive inputs from a user, a server computer coupled to the communication device that uses artificial intelligence to determine one or more configurations of the reference payment device and also includes a database of all potential tests that may be performed on the reference payment device, and a testing device configured to receive information about one or more tests to be performed on the reference payment device. The system further includes a configuration generation system configured to receive information about one or more configurations of the reference payment device.

Embodiments of the present invention reduce misinterpretation of specification and testing requirements by human error, which may lengthen a testing and certification process of a payment device. Some embodiments of the present invention reduce misinterpretation of payment device description by verifying the set of features specific to the payment device for consistency and errors and ensure compliance with the specification of the payment processing system automatically. Still other embodiments of the present invention automatically list all the tests applicable to a reference payment device and its specific set of features so neither the user (vendor) nor the tester has to figure out which set of tests to run.

Certain embodiments of the present invention provide a system that automates the testing process from the reference payment device preparedness through test results analysis. The system receives input indicative of one or more features included in a reference payment device, uses artificial intelligence to determine and generate one or more configurations of the reference payment device for testing purposes based at least in part on the one or more features of the payment device, uses artificial intelligence to determine from a database of all potential tests to perform a test plan of one or more tests to apply to each such determined configuration of the reference payment device based at least in part on the one or more features of the payment device, executes such determined test plan and records all test results, uses artificial intelligence to analyze test result records against expected results according to the specification and delivers a final testing assessment of the reference payment device.

The following detailed description, together with the accompanying drawings will provide a better understanding of the nature and advantages of the present invention.

DETAILED DESCRIPTION

As described earlier, in order to market a payment device, e.g., a credit card or a POS device, a vendor must first create a reference payment device with all the features he wants to include in the payment device and then test the reference payment device to ensure that it complies with the specification of the targeted payment processing system. Once the reference payment device is certified for use with the payment processing system, the vendor can then market actual payment devices that include the tested features to consumers.

Certain embodiments of the present invention provide a method for automatically generating a listing of tests to be performed on a reference payment device. The listing of tests is generated based on the specific set of features included in the reference payment device. In some embodiments, the method further generates a listing of configurations to be used for testing the specific set of features of the reference payment device. Some embodiments of the present invention provide a system for generating the listing of tests and the one or more configurations.

Figure 1:
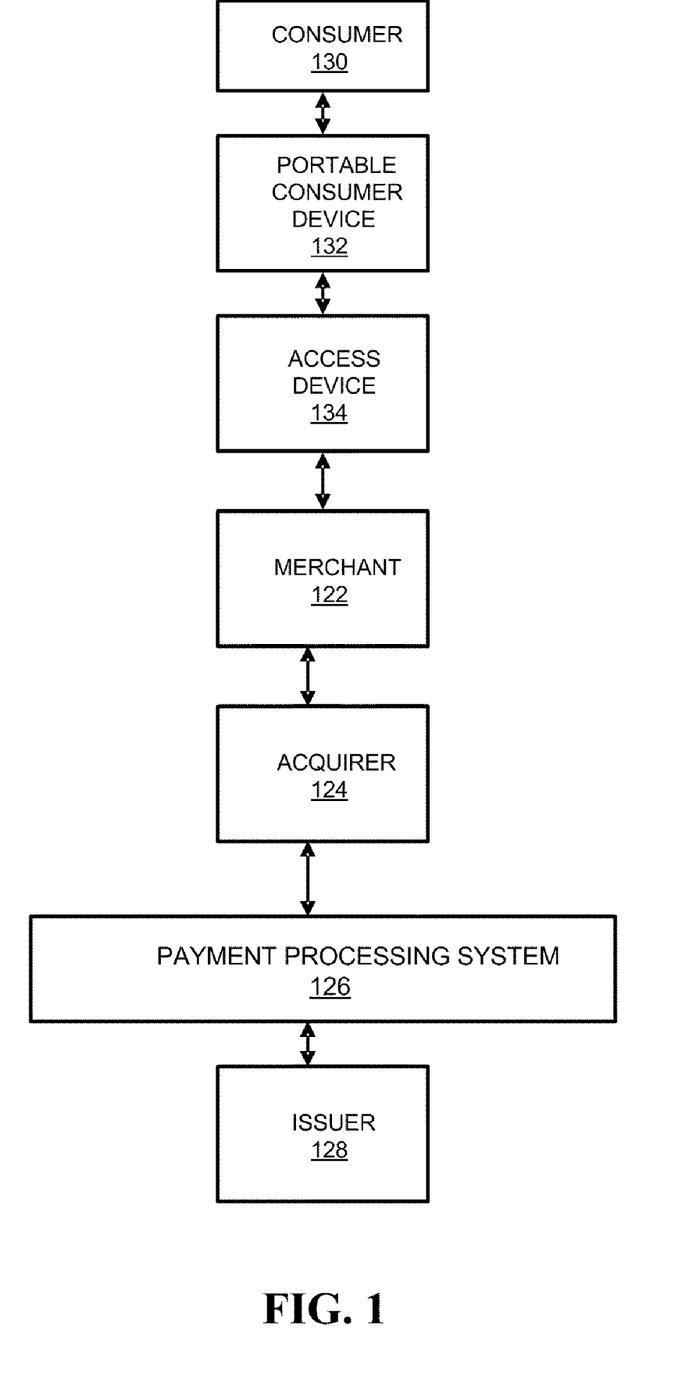
FIG. 1 is a block diagram illustrating a payment transaction process occurring between a consumer and a merchant.

FIG. 1 shows a system 120 for performing a transaction using a payment processing system. The system 120 includes a merchant 122 and an acquirer 124 associated with the merchant 122. In a typical payment transaction, a consumer 130 may purchase goods or services at the merchant 122 using a portable consumer device 132. The acquirer 124 can communicate with an issuer 128 via a payment processing system 126. The consumer 130 may be an individual, or an organization such as a business that is capable of purchasing goods or services.

The portable consumer device 132 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing system 126 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 126 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 126 may use any suitable wired or wireless network, including the Internet.

The merchant 122 may also have, or may receive communications from, an access device 134 that can interact with the portable consumer device 132. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 134 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 132.

In a typical purchase transaction, the consumer 130 purchases a good or service at the merchant 122 using a portable consumer device 132 such as a credit card. The consumer's portable consumer device 132 can interact with an access device 134 such as a POS (point of sale) terminal at the merchant 122. For example, the consumer 130 may take a credit card and may swipe it through an appropriate slot in the POS terminal. Alternatively, the POS terminal may be a contactless reader, and the portable consumer device 132 may be a contactless device such as a contactless card.

An authorization request message is then forwarded to the acquirer 124. After receiving the authorization request message, the authorization request message is then sent to the payment processing system 126. The payment processing system 126 then forwards the authorization request message to the issuer 128 of the portable consumer device 132.

After the issuer 128 receives the authorization request message, the issuer 128 sends an authorization response message back to the payment processing system 126 to indicate whether or not the current transaction is authorized (or not authorized). The transaction processing system 126 then forwards the authorization response message back to the acquirer 124. The acquirer 124 then sends the response message back to the merchant 122.

After the merchant 122 receives the authorization response message, the access device 134 at the merchant 122 may then provide the authorization response message for the consumer 130. The response message may be displayed by the POS terminal, or may be printed out on a receipt.

At the end of the day, a normal clearing and settlement process can be conducted by the transaction processing system 126. A clearing process is a process of exchanging financial details between and acquirer and an issuer to facilitate posting to a consumer's account and reconciliation of the consumer's settlement position. Clearing and settlement can occur simultaneously.

Each payment processing system has a specification that the payment processing system operates under. The various entities described above, comply with the specification of a particular payment processing system in order to interact with that payment processing system. For example, the issuer, acquirer, etc. adhere to the specification of the payment processing system that they wish to interact with. Similarly payment devices, such as, a credit card or a POS system also adhere to the specification of the payment processing system. In order to ensure that the payment devices comply with the specification, a vendor builds a reference payment device and demonstrates the reference payment device's compliance with the specification of a particular payment processing system. A payment device cannot be used in a payment processing system until it is certified by the entity that manages the payment processing system.

Figure 2:
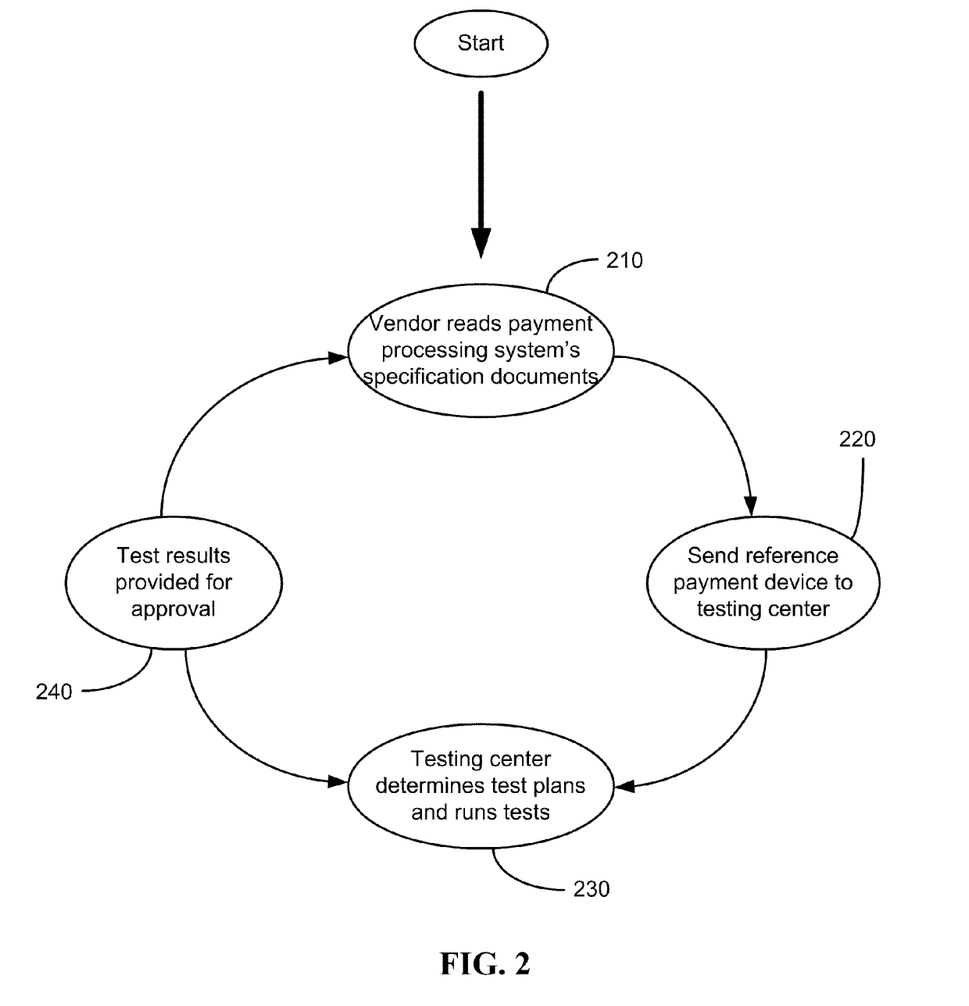
FIG. 2 illustrates a conventional testing and certification process for a payment device.

FIG. 2 is a schematic illustrating a conventional testing process for a payment device. The testing process begins when a vendor decides to offer a payment device for use with a particular payment processing system. As a first step, the vendor reads the specification documentation associated with the payment processing system (210). Based on the features that the vendor wishes to offer in his payment device, the vendor determines the type of reference payment device and set of configurations he needs to provide for testing purposes. If the vendor does not understand the specification, he has to consult with the specification owner to determine how to build a reference payment device and generate the appropriate set of configurations for testing purposes. Once the vendor determines the structure of a payment device, he can manufacture a reference payment device and generate the appropriate set of configurations and send them to a testing center (220) along with all the necessary supporting documents describing the set of features included in the reference payment device. The supporting documents include information about the reference payment device features. The testing center/location is usually accredited by the entity that manages the payment processing system. The testing center then determines the appropriate tests to run based on the specific set of features of the payment device as described in supporting documents provided by the vendor and the payment processing system's specification (230). The testing center often consults with the vendor and the specification owner to make sure the support documents are accurate, prior to determining the tests to be run. The testing center then performs the selected tests and provides the results to the certification authority, e.g., the entity that manages the payment processing system, for certification. If the test results are successful, the payment device is certified for use with the payment processing system. If not, the vendor has to start the testing process all over again.

There are many instances in the testing process where delays often occur resulting in long certification times for vendors and frustration on both the vendor end as well as the certifying authority's end. In many instances, the vendor incorrectly interprets the specification resulting in the vendor creating an incorrect implementation of the reference payment device. In other instances, the testing center may incorrectly interpret the description of the features effectively included in the reference payment device and consequently select the inappropriate tests to run on the reference payment device. In addition, the testing center often does not anticipate correctly what results are to be expected from certain tests depending on the payment device's features and thus is unable to verify the results prior to submitting them for certification. If the tests fail, the vendor has to invest significant time in understanding the cause of failure, e.g., inappropriate configurations or non-applicable tests. Embodiments of the present invention provide methods and systems to eliminate the errors and delays and reduce the time needed for certification of a payment device.

Figure 3:
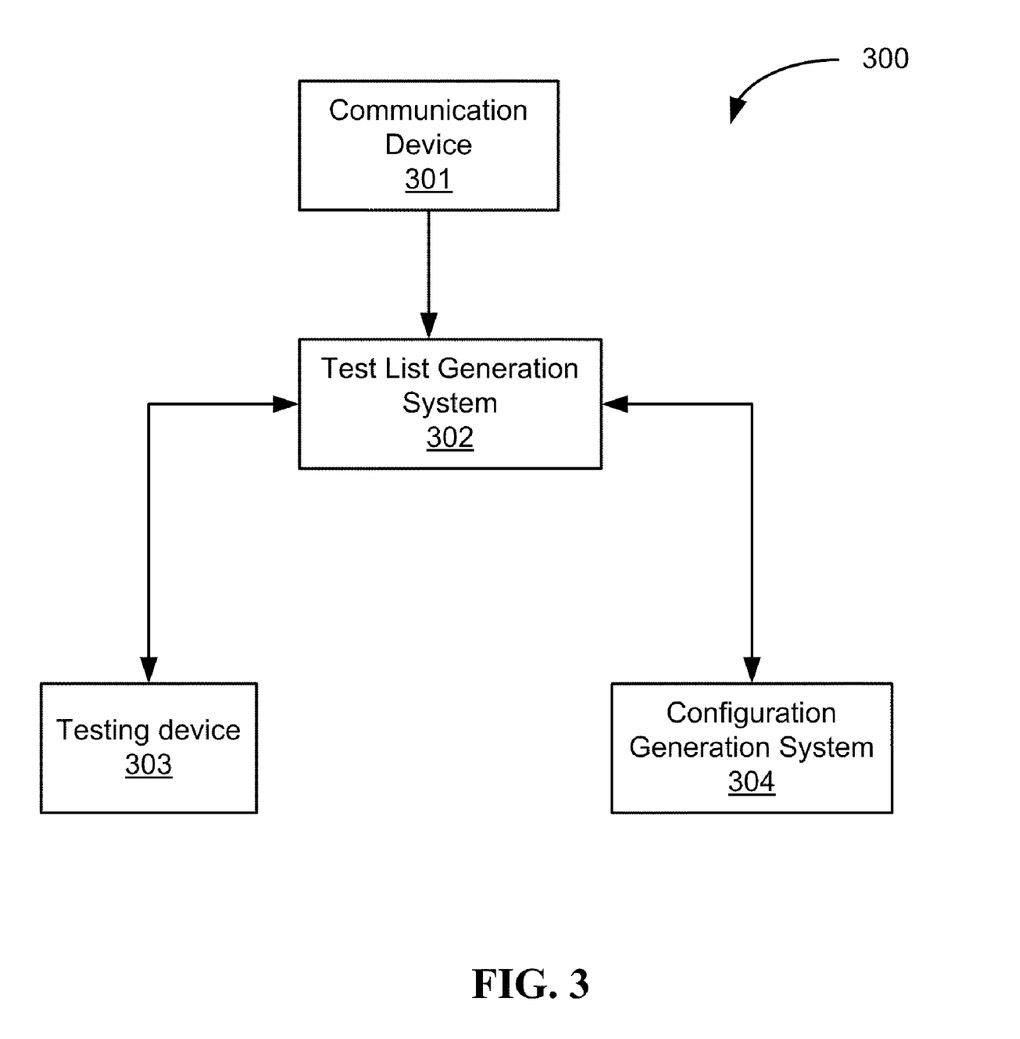
FIG. 3 illustrates a system for determining a test list for a reference payment device according to an embodiment of the present invention.
Figure 6A:
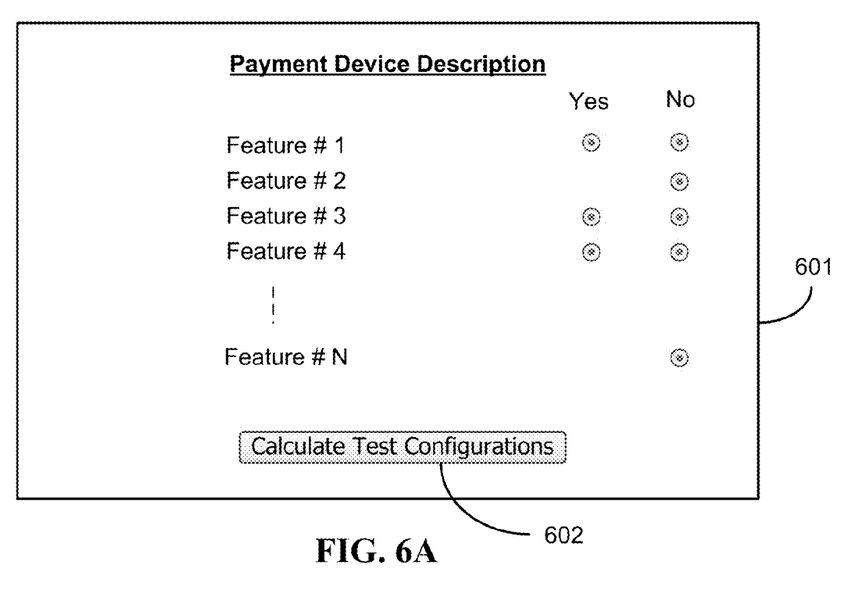
FIGS. 6A-6C illustrate sample user input screens for receiving inputs, determining a list of configurations, and determining a list of tests to be performed on a reference payment device according to an embodiment of the present invention.
Figure 6B:
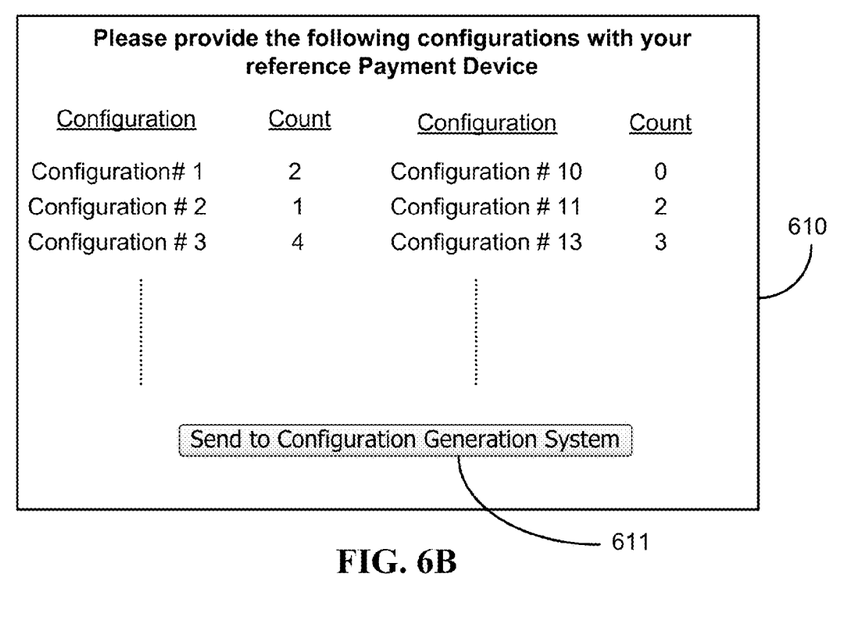
Figure 6C:
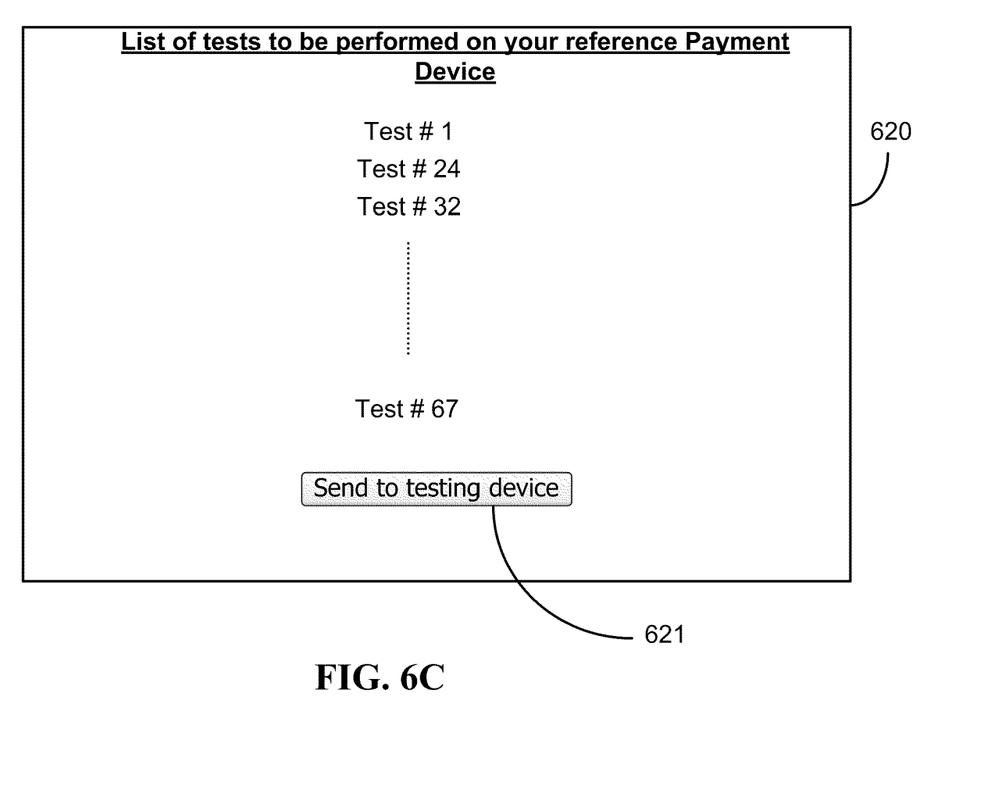

As described earlier, in order for a payment device to be certified for use with a payment processing system, it has to pass the tests requested to prove compliance with the specification of the payment processing system. FIG. 3 illustrates a block diagram of a system 300 for determining a list of tests to be performed on a reference payment device based at least in part on the one or more features of the payment device according to an embodiment of the present invention. The system 300 includes a communication device 301. The communication device 301 may be a general purpose computer capable of hosting a user interface and communicating with a server over a network, e.g., the Internet. In some embodiments, device 301 may include a software application that includes a user interface designed to accept inputs from a vendor. The user inputs may indicate selection of specific set of features to be included in the payment device. The software application may then communicate the received inputs to a remote server, which may determine the tests to be run. In other embodiments, the software application can receive the input and the communication device 301 may determine a list of tests to be performed on the reference payment device without interaction with an external system. In yet other embodiments, the software application may be a web browser capable of accessing an external location that hosts the software application that determines the tests to be performed on the reference payment device. FIGS. 6A-6C show some sample user interface screens that the vendor might be presented with for providing information about one or more features of the payment device.

The communication device 301 is coupled to a test list generation system 302. The test list generation system 302 can be a server computer that is remotely located from the communication device 301. In some embodiments, the communication device 301 and the test list generation system 302 can be implemented in a single computer/server. In some embodiments, the test list generation system 302 may be implemented via a web interface. In this instance, an authorized user can logon to gain access to the test criteria generation system 302 using the communication device 301. In some embodiments, the communication device 301 may be a handheld device capable of communicating with the test list generation system 302.

The test list generation system 302 includes a database of all potential tests that can be performed on a reference payment device based on various mandatory and optional features that may be included in a payment device according to the payment processing system's specification. After receiving inputs related to the features to be included in the payment device, the test list generation system 302 uses artificial intelligence to generate a list of tests to be performed on the reference payment device using the information in the database and based at least in part on the features of the payment device. In some embodiments, this list can be communicated to a testing device 303 along with information about expected results from running the specified tests. Concurrently, the test list generation system 302 can generate a list of configurations for the reference payment device and communicate that list to a configuration generation system 304. A particular configuration can simulate a particular feature of a payment device as explained below.

Each payment device can be configured to have one or more features. For example, some of the features for a credit card may include presence or absence of an embedded chip, type of encryption supported, etc. For a POS device, some of the features may include ability to interact with contact-type as well as contactless payment cards, built-in printer, etc. There are some features that may be mandatory for a particular payment device. In some embodiments, the mandatory features may represent features that enable operation of the payment device. In addition to these mandatory features, there may be several optional features that the vendor may be able to offer in his payment device. A vendor of a particular payment device usually decides which features, from among the available optional features, defined in the payment processing system's specification, are to be included in his payment device. Each of these optional features can have a particular configuration associated with it. The operation of the feature can be tested for compliance using a configuration associated with that feature. Based on the number of optional features selected by the vendor, one or more configurations of the reference payment device can be provided to the testing center. The type and amount of testing required for a payment device depends on the features included in the payment device.

In some embodiments, the testing device 303 can send back the test results, e.g., in form of analysis and reports, automatically to the test list generation system 302 after the specified tests have been performed. After receiving the test results, the test list generation system 302 can analyze the test results and using artificial intelligence and determine whether the payment device meets the required compliance criteria of the payment processing system's specification. In some embodiments, the configuration generation system 304 can also generate a report listing the configurations of the reference payment device required and send the report to the test list generation system 302. The reports from the testing device 303 and the configuration generation system 304 can be used to further verify that the appropriate set of configurations of the reference payment device were used during testing and the appropriate tests were performed on each of the configurations of the reference payment device.

Figure 4:
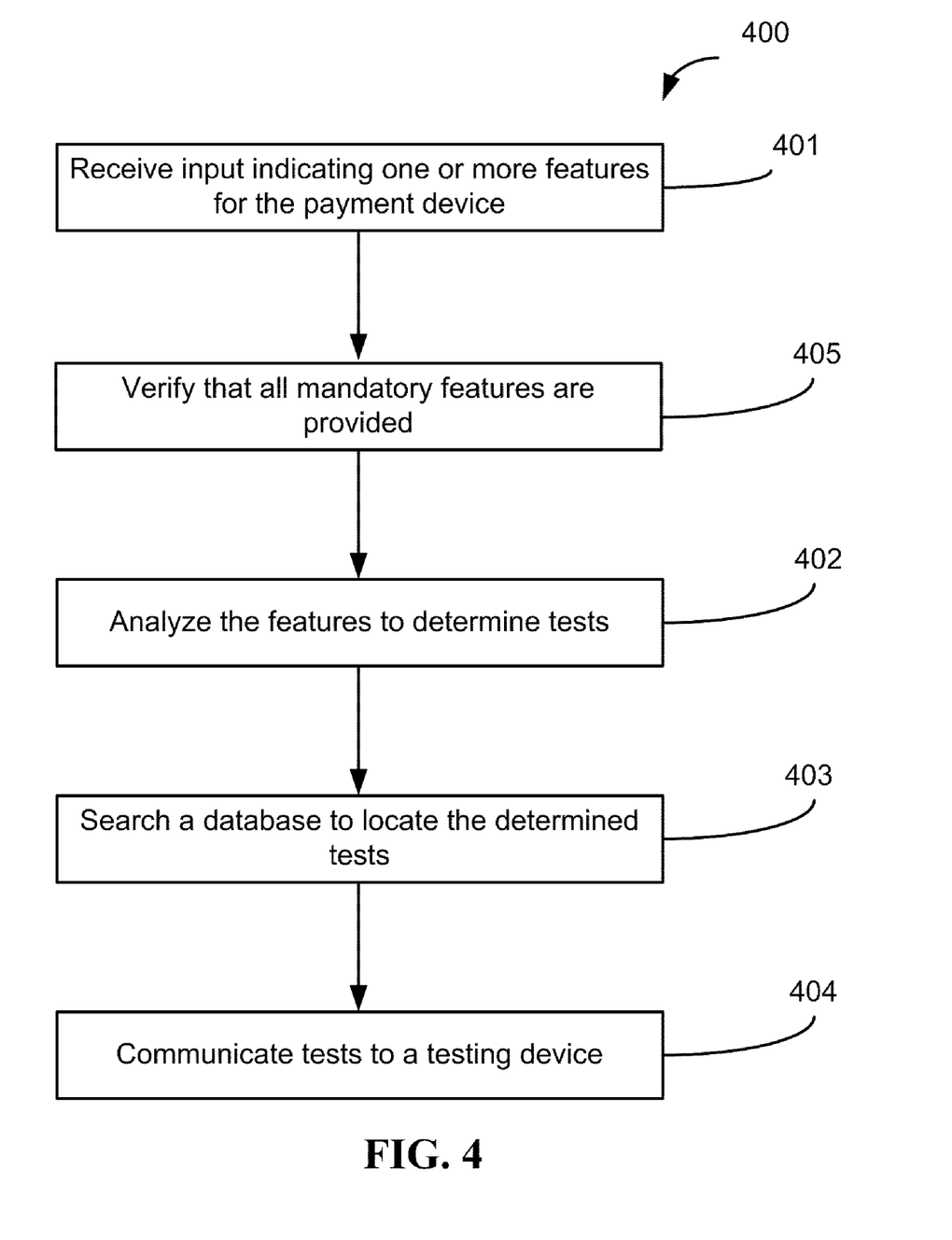
FIG. 4 is a flow diagram of a process for determining testing requirements for a reference payment device according to an embodiment of the present invention.

Certain embodiments of the present invention provide methods for generating and communicating test plans for payment devices. FIG. 4 is a flow diagram of a process 400 for generating a test plan that includes one or more tests to be performed on a reference payment device, according to an embodiment of the present invention. At step 401, the test list generation system receives input indicating one or more features that the vendor wishes to incorporate into his payment device. Depending on the payment processing system's specification, there may be several features that can be included in the payment device. A vendor may choose to offer only a subset of the entire available feature set in his payment device. Often the selection of features depends on the vendor's target market, price, core competencies of the vendor, etc. Once the vendor has decided which features to offer in his payment device, the vendor can, e.g., using the web interface or a software application resident on his computer, select the desired features. In some embodiments, in addition to selecting features, the vendor may also submit other information relevant for the entity managing the payment processing system's certification scheme. Some of this other information may include a vendor ID, contact information, the type of testing desired, the testing center ID, etc.

Once the vendor has submitted his selection of features, this information may be sent to a server for analysis. At step 405, the server analyzes the information related to the features and verifies that all the mandatory features have been entered by the vendor. If any of the mandatory features are missing, the server may provide a notification indicating which mandatory feature(s) are missing and request that the missing feature(s) be provided prior to continuing process 400. Mandatory features are those features without which a payment device will not function properly. In other words, mandatory features are those features that are needed, at a minimum, to make a payment device functional.

The server then analyzes the information related to the features and using artificial intelligence determines the list of tests that need to be performed on a reference payment device, at step 402. At step 403, the server may search a database of all potential tests that may be performed on a reference payment device perform based on the payment processing system's specification to locate information about the tests determined in step 403. In some embodiments, the artificial intelligence algorithms may be loaded onto the vendor's computer so that the analysis of the information related to the features can be performed on the vendor's computer. In addition, in some embodiments, the database may also be resident on the vendor's computer so that steps 401-403 may be performed on the vendor's computer. Once the list of one or more tests to be performed is generated, the list is communicated to a testing device that executes the actual tests on the reference payment device, at step 404.

It will be appreciated that process 400 described herein is illustrative and that variations and modifications are possible. Acts described as sequential can be executed in parallel, order of acts can be varied, and acts can be modified or combined. For instance, steps 402 and 403 can be combined and executed by the vendor's computer, e.g., the communication device 301 of FIG. 3. In some instances, step 402 may be performed by the vendor's computer while step 403 may be performed by the server, e.g., the test list generation system 302 of FIG. 3.

Figure 5:
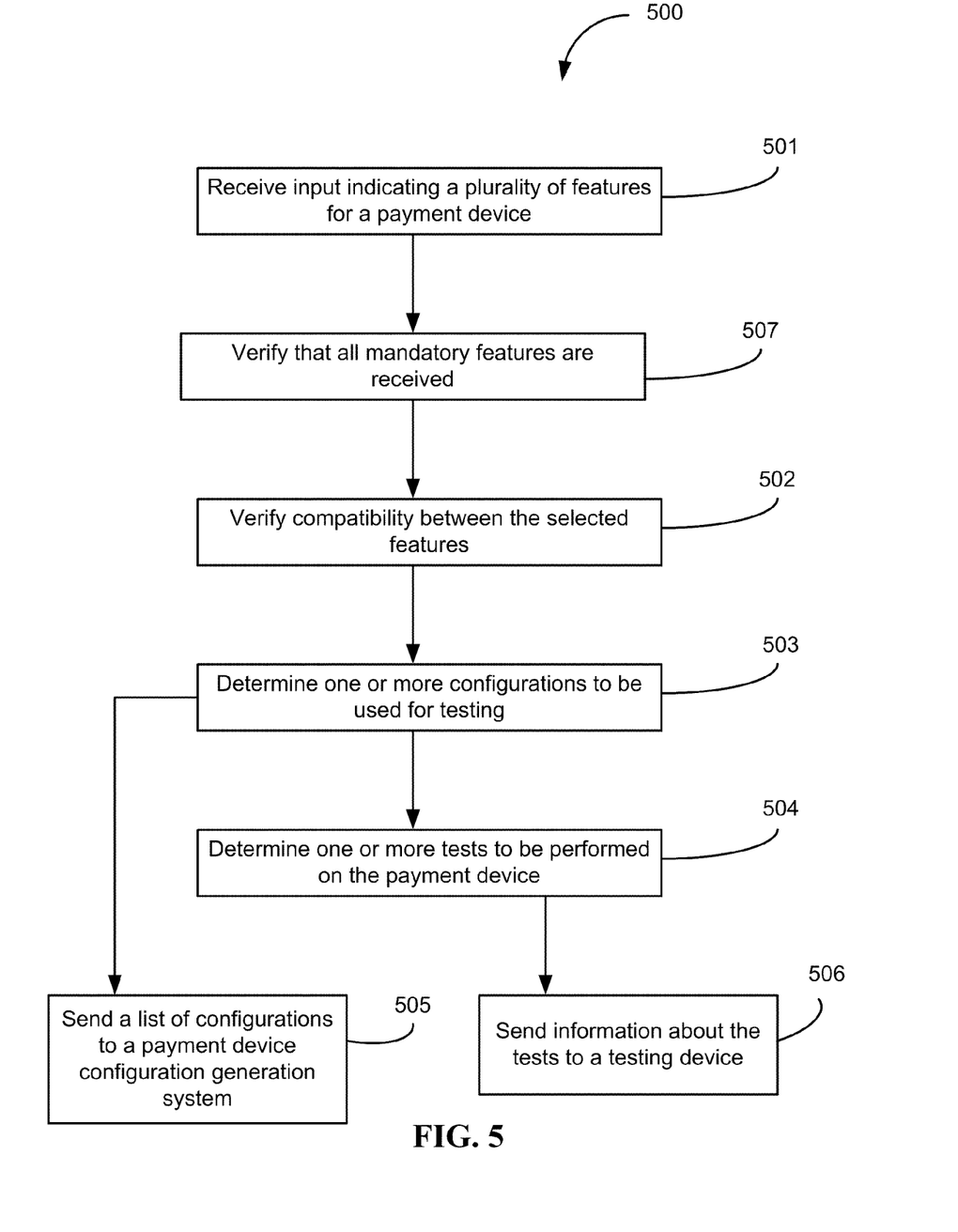
FIG. 5 is a flow diagram of a process for determining testing requirements for a reference payment device and determining configurations to be generated for testing purposes according to an embodiment of the present invention.

In addition to generating a list of tests to be performed on a reference payment device, some embodiments of the present invention can also generate configurations to be included in the reference payment device. The configurations are generated based on the selected features to be included in the payment device. FIG. 5 is a flow diagram of a process 500 for generating test plans and test configurations for a payment device according to another embodiment of the present invention. At step 501, the vendor enters information indicative of one or more features associated with a payment device that the vendor wishes to get certified. After receiving the one or more features associated with the payment device at step 501, the system verifies that all the mandatory features have been entered by the vendor at step 507. If any of the mandatory features are missing, the system may provide a notification indicating which mandatory feature(s) are missing and request that the missing feature(s) be provided prior to continuing process 500.

At step 502, the system verifies compatibility between the one or more features. In some embodiments, the system determines whether there are features that are mutually exclusive and/or whether there are features that are dependent on each other. For instance, selection of certain encryption method may preclude use of some other features while inclusion of a first feature may require inclusion of a second feature in order for the first feature to operate properly. In some embodiments, the functionality of performing such checks can be built into the system so that the vendor using the system does not have to spend time in determining the dependencies between the myriad of available features. This significantly reduces the time spent by the vendor to determine a correct implementation for his reference payment device and to determine the correct tests that apply to his reference payment device. Thus, the system can take the guesswork out of the equation by automating the process and reducing the chances of errors introduced due to misinterpretation of the specification.

At step 503, the system determines one or more configurations of the reference payment device. As described above, each configuration may be associated with one or more features. A reference payment device's configuration is a vehicle used to test the operation of the feature or features associated with that configuration. The one or more configurations are selected based at least in part on the one or more features selected by the vendor. The system sends the information about the one or more configurations to a configuration generation system at step 505. The configuration generation system generates a configuration of the reference payment device for testing purposes. Concurrently, the system also determines one or more tests that apply to each configuration of the reference payment device based at least in part on the one or more features selected by the vendor, at step 504. The system communicates the information about the list of one or more tests for each of the reference payment device's configurations to a testing device at 506.

It will be appreciated that process 500 described herein is illustrative and that variations and modifications are possible. Acts described as sequential can be executed in parallel, order of acts can be varied, and acts can be modified or combined. For instance, in some embodiments, in addition to determining the configurations and the tests to be performed on the reference payment device, the system can also generate a report indicating what results one should expect from executing the determined tests. This provides the vendor or the testing center with a self-check option to verify the test results before submitting them to the certification authority. In the instance where the actual test results do not comply with the expected results, the vendor or the testing center can re-execute the tests with the appropriate correction to the reference payment device instead of submitting the incorrect test results to the certification authority. This will further reduce the amount of time needed for certification.

In some embodiments, the system can directly receive the test results from the testing device, thus further speeding up the certification process. Usually, the vendors use an independent testing center to perform the testing of the reference payment device. In this instance, the vendor, the testing center, and the payment processing system's certification authority may be interconnected such that the vendor can input the desired features into the system, the system generates the list of configurations to be provided to the vendor and list of tests to be performed by the testing center, the system communicates the information about the configurations and tests to the appropriate systems, the vendor generates such determined set of reference payment device configurations and sends them to the testing center, the testing center verifies the reference payment device configurations provided, executes such determined set of tests for each configuration and sends the test results back to the system/payment processing system's certification authority. By automating majority of the steps in the testing process, a new payment device can be tested in a relatively short period of time. For example, using the conventional testing process described in FIG. 2, the average testing time for a new payment device can be between 46 days to 79 days. Embodiments of the present invention can reduce that time to between 27 and 31 days, thus providing between 40% to 60% improvement over the current process with additional reduction in time possible.

Figure 6D:
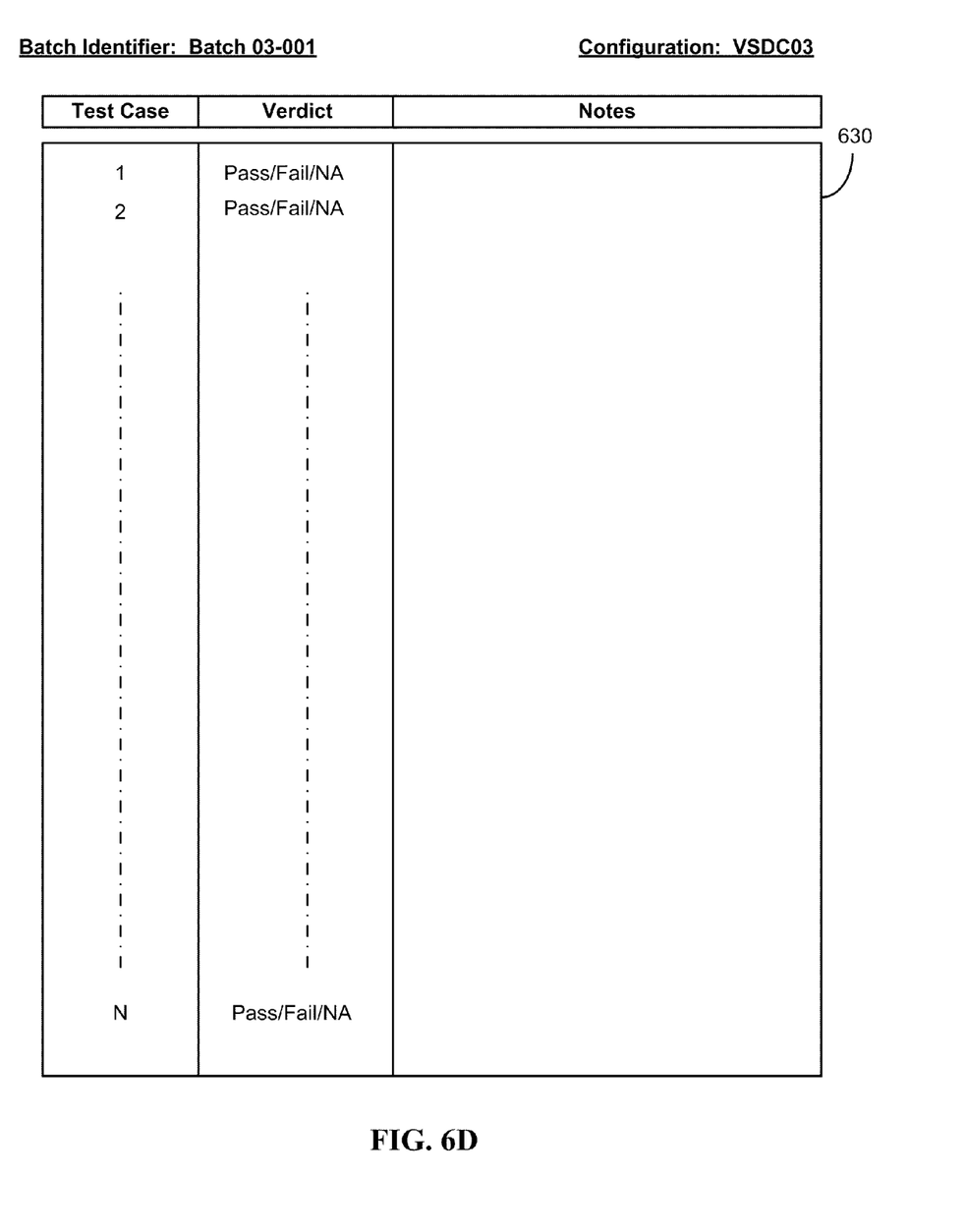
FIG. 6D illustrates a test results screen according to an embodiment of the present invention.

As described above, the vendor may be presented with a user interface to input information about one or more features for his payment device. The vendor can enter the information related to his payment device in one or more of user interface screens. FIGS. 6A-6C illustrate sample user interface screens that a vendor may be presented with, according to an embodiment of the present invention. FIG. 6A illustrates a sample screen 601 where a user can select the features relevant to the payment device. In some embodiments, there may be several screens that the vendor may have to navigate in order to enter all the information about his payment device. For purposes of simplicity, only one sample screen for selecting the desired features is shown. Once the desired features are selected, the vendor can select the 'calculate test configurations' button 602. Selecting the 'calculate test configurations' button 602 results in the system presenting, on the user interface screen, a list of reference payment device configurations and a list of tests to be performed on the reference payment device. FIG. 6B shows a sample screen 610 showing a listing of configurations to be provided for testing a reference payment device. As illustrated in FIG. 6B, the listing includes identification of the configuration and the number of samples to be provided for each configuration. The user can select button 611 to send the configuration information to a configuration generation system. In some embodiments, the information may be automatically sent to the configuration generation system, e.g., after selecting the button 602, without need for any further intervention by the vendor. FIG. 6C illustrates a sample screen 620 listing the tests to be performed on a reference payment device based on the features included in the payment device. The user can either select the button 621 to display information about the tests to be performed or the system can send the list of tests automatically to the testing tool, e.g., after selecting the button 602. FIG. 6D illustrates a sample screen 630 for displaying the test results for the various tests performed on the reference payment device. In some embodiments, the testing center can populate this screen after the tests have been performed. In some embodiments, this screen may be automatically populated by the system using the test results data received from the testing device.

It is to be noted that the user interface screens shown in FIGS. 6A-6D are for illustration purposes only. One skilled in the art will realize that various other formats for user interface screens can be created and the user interface screens can include other information not specifically disclosed herein.

Figure 7:
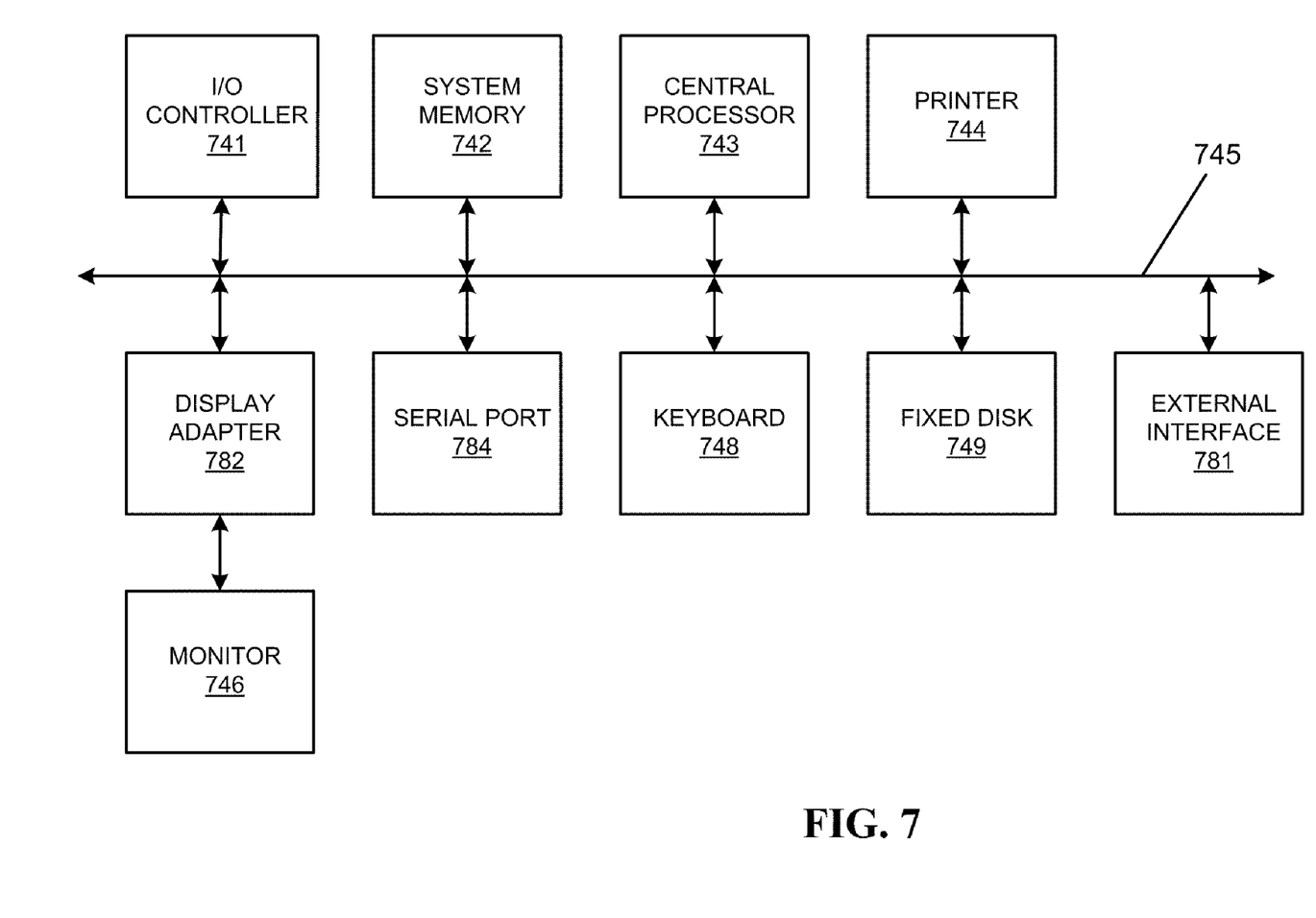
FIG. 7 shows a high level block diagram of a computer system that may be used to implement the test criteria selection system according to an embodiment of the invention.

FIG. 7 is a high level block diagram of a computer system that may be used to implement any of the components of system 300 described above and may include one or more of the subsystems or components shown in FIG. 7, which is a block diagram of a computer apparatus. The subsystems shown in FIG. 7 are interconnected via a system bus 745. Additional subsystems such as printer 744, keyboard 748, fixed disk 749, monitor 746, which is coupled to display adapter 782, and others are shown. Peripherals and input/output (I/O) devices, which couple to I/O controller 741, can be connected to the computer system by any number of means known in the art, such as serial port 784. For example, serial port 784 or external interface 781 can be used to connect the computer apparatus to a wide area network such as the Internet, a mouse input device, or a scanner. The interconnection via system bus 745 allows central processor 743 to communicate with each subsystem and to control the execution of instructions from system memory 742 or fixed disk 749, as well as the exchange of information between subsystems. The system memory 742 and/or fixed disk 749 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A computer-implemented method for generating a test plan for a payment device, by a computer system, the method comprising:
   receiving, by the computer system, input indicative of one or more features associated with a payment device;
   verifying, by the computer system, that all mandatory features for the payment device are received;
   verifying, by the computer system, compatibility between the one or more features associated with the payment device;
   determining, by the computer system, one or more tests to be performed on a reference payment device, based at least in part on the one or more features associated with the payment device, wherein the reference payment device includes the one or more features;
   determining, by the computer system, one or more reference payment device configurations, the one or more configurations being selected based at least in part on the one or more features associated with the payment device;
   communicating, by the computer system, information about the one or more tests to be performed on the reference payment device to a testing device; and communicating, by the computer system, information about the one or more configurations to a configuration generation system.

2. The method of claim 1 wherein the payment device is one of a credit card, a debit card, a smart card, a point of sale (POS) terminal, or a card reading device.

3. The method of claim 1 wherein the one or more tests are generated based on a payment processing system specification.

4. The method of claim 3 wherein the specification includes information about one or more tests to be executed on the reference payment device, the one or more tests corresponding to the one or more features associated with the payment device.

5. The method of claim 1 wherein verifying compatibility between the one or more features associated with the payment device includes:
   determining whether there are features, from among the one or more features, that are mutually exclusive; and
   determining whether there are features, from among the one or more features, that are dependent on each other.

6. The method of claim 1 further comprising:
   receiving, by the computer system from the testing device, results of the one or more tests performed on the reference payment device.

7. The method of claim 6 further comprising:
   comparing, by the computer system using artificial intelligence, the results of the one or more tests with expected results based on the specification; and
   providing a final test result for the reference payment device.

8. The method of claim 1 wherein the testing device is located remotely from the computer system.

9. The method of claim 1 further comprising:
   providing a user interface configured to receive the input indicative of the one or more features associated with the payment device.

10. A computer-readable storage medium including instructions which when executed by a processor embedded in a computer system, cause the computer system to perform a method for determining a test to be performed on a reference payment device, the method comprising:
    receiving information related to a plurality of features associated with a payment device;
    verifying that the plurality of features include mandatory features associated with the payment device;
    verifying that the plurality of features are compatible with each other;
    determining one or more reference payment device configurations, based at least in part on the information related to the plurality of features;
    determining one or more tests to be performed on the reference payment device, based at least in part on the information related to the plurality of features;
    communicating the one or more configurations to a configuration generation system; and
    communicating information about the one or more tests for each of the one or more reference device payment configurations to a testing device.

11. The computer-readable storage medium of claim 10 wherein the method further comprises receiving test results from the testing device.

12. The computer-readable storage medium of claim 10 wherein verifying that the plurality of features are compatible with each other includes:
    determining whether there are features, from among the plurality of features, that are mutually exclusive; and
    determining whether there are features, from among the plurality of features, that are dependent on each other.

13. The computer-readable storage medium of claim 10 wherein the payment device is a credit card, a debit card, a pre-paid card, a smart card, a contactless card, a point-of-sale (POS) device, or a contactless card reader.

14. The computer-readable storage medium of claim 10 wherein the method further comprises providing a user interface operable to receive input related to the plurality of features.

15. A system for testing a reference payment device, the system comprising:
    a communication device configured to present a user interface to a user, the user interface configured to receive inputs, from the user, related to a plurality of features associated with a payment device;
    a server computer coupled to the communication device and including a database comprising information about a plurality of tests for the reference payment device, the server computer configured to use artificial intelligence to determine a list of tests, from among the plurality of tests, to be performed on the reference payment device, the list of tests based at least in part on the plurality of features associated with the payment device; and
    a testing device configured to receive information, from the server computer, about the list of tests to be performed on the reference payment device.

16. The system of claim 15 further comprising a configuration generation system configured to receive information, from the server computer, about one or more configurations generated for the reference payment device.

17. The system of claim 16 wherein the server computer is further configured to communicate, to the testing device, information about one or more tests to be performed on the reference payment device based on the one or more configurations generated for the reference payment device and the plurality of features associated with the payment device.

18. The system of claim 15 wherein the testing device is further configured to communicate test results to the server computer.

19. The system of claim 18 wherein the server computer is further configured to:
    receive the tests results from the testing device;
    analyze, using artificial intelligence, the test results to determine conformity to expected results; and
    provide a final testing assessment for the reference payment device.

* * * * *